(12) United States Patent
Visoz et al.

(10) Patent No.: US 12,513,027 B2
(45) Date of Patent: Dec. 30, 2025

(54) METHOD FOR PROCESSING RADIO-FREQUENCY SIGNALS RECEIVED ON R ANTENNAS, AND CORRESPONDING RECEPTION METHOD, DECODING METHOD, COMPUTER PROGRAM AND SYSTEM

(71) Applicant: Orange, Issy-les-Moulineaux (FR)

(72) Inventors: Raphaël Visoz, Chatillon (FR); Atoosa Hatefi, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/566,987

(22) PCT Filed: Jun. 3, 2022

(86) PCT No.: PCT/FR2022/051059
§ 371 (c)(1),
(2) Date: Dec. 4, 2023

(87) PCT Pub. No.: WO2022/254161
PCT Pub. Date: Dec. 8, 2022

(65) Prior Publication Data
US 2024/0275648 A1 Aug. 15, 2024

(30) Foreign Application Priority Data

Jun. 4, 2021 (FR) ...................................... 2105931

(51) Int. Cl.
*H04L 23/02* (2006.01)
*H04B 7/0452* (2017.01)
(Continued)

(52) U.S. Cl.
CPC ..... *H04L 25/03891* (2013.01); *H04B 7/0452* (2013.01); *H04B 7/0837* (2013.01); *H04L 25/0224* (2013.01)

(58) Field of Classification Search
CPC ............. H04L 25/0224; H04L 25/0242; H04L 25/0204; H04B 17/345; H04B 7/0617; H04B 7/086; H04W 88/085
(Continued)

(56) References Cited

U.S. PATENT DOCUMENTS

2008/0159450 A1* 7/2008 Fite ................... H04L 25/03006
375/346
2016/0315674 A1 10/2016 Li et al.
(Continued)

FOREIGN PATENT DOCUMENTS

WO WO 2020/130895 A1 6/2020

OTHER PUBLICATIONS

International Search Report for International Application No. PCT/FR2022/051058, dated Sep. 9, 2022.
(Continued)

*Primary Examiner* — Khai Tran
(74) *Attorney, Agent, or Firm* — Knobbe, Martens, Olson & Bear, LLP (57) ABSTRACT

A method for processing radio-frequency signals received on R antennas, where R≥2, includes, implemented by a radio unit: obtaining a frequency representation of the radio-frequency signal received on an antenna, demapping the frequency representations, first estimation of the transmission channel of the radio-frequency signals and of a noise-plus-interference covariance, projecting a vector of R complex samples onto a vector of L complex samples, referred to as projected samples, transmitting the vector of L projected samples to a base band processing unit, as well as the following, implemented by the base band processing unit: receiving the vector of L projected samples transmitted by the radio unit, demapping the L projected samples, second estimation of the transmission channel of the radio-fre-
(Continued)

quency signals, after projection, equalising the L projected samples, taking account of the second channel estimation, processing the equalised symbols.

11 Claims, 3 Drawing Sheets

(51) Int. Cl.
*H04B 7/08* (2006.01)
*H04L 25/02* (2006.01)
*H04L 25/03* (2006.01)

(58) Field of Classification Search
USPC .................................... 375/262, 260, 267
See application file for complete search history.

(56) References Cited

U.S. PATENT DOCUMENTS

| 2020/0204248 | A1 | 6/2020 | Lu et al. | |
| 2022/0217018 | A1* | 7/2022 | Huang | H04B 17/309 |
| 2022/0329289 | A1* | 10/2022 | Huang | H04L 5/0048 |
| 2024/0267111 | A1* | 8/2024 | Visoz | H04L 25/021 |

OTHER PUBLICATIONS

International Search Report for International Application No. PCT/FR2022/051059, dated Sep. 12, 2022.

* cited by examiner

METHOD FOR PROCESSING RADIO-FREQUENCY SIGNALS RECEIVED ON R ANTENNAS, AND CORRESPONDING RECEPTION METHOD, DECODING METHOD, COMPUTER PROGRAM AND SYSTEM

CROSS-REFERENCE TO RELATED APPLICATIONS

This application is filed under 35 U.S.C. § 371 as the U.S. National Phase of Application No. PCT/FR2022/051059 entitled "METHOD FOR PROCESSING RADIO-FREQUENCY SIGNALS RECEIVED ON R ANTENNAS, AND CORRESPONDING RECEPTION METHOD, DECODING METHOD, COMPUTER PROGRAM AND SYSTEM" and filed Jun. 3, 2022, and which claims priority to FR 2105931 filed Jun. 4, 2021, each of which is incorporated by reference in its entirety.

BACKGROUND

Field

The field of the development is that of telecommunications.

More specifically, the development relates to uplink communications, that is from the mobile terminals (or UE for "User Equipment") to a base-station (or eNodeB, gNodeB, etc.).

In particular, the development proposes a new distribution of the functionalities implemented by a radio unit and by a base band processing unit, for decoding radio-frequency signals received on a plurality of antennas of a base station.

The proposed solution applies in particular, but not exclusively, in the context of 5G NR ("New Radio") mobile networks.

Description of the Related Art

Typically, a radio-frequency signal received on an antenna undergoes analogue processing, analogue-to-digital conversion and then digital processing.

Digital processing can be performed by a base band processing unit, also referred to as a Base Band Unit (BBU) or a Distributed Unit (DU).

The active part of the analogue processing can be performed by a Radio Unit (RU), also referred to as a Remote Radio Head (RRH). For this purpose, it is recalled that within the analogue processing part, a distinction can be made between a passive part, comprising in particular the antenna radiating elements, and an active part, comprising in particular the filters, amplifiers, analogue/digital converters, etc.

The evolution of base stations and of associated antenna structures has involved separating analogue and digital processing functionalities, bringing analogue processing as close as possible to the antenna, or even integrating it into the antenna panel.

Thus, the first generations of antennas implemented only one antenna. The base station BTS (Base Transceiver Station) was connected to the passive elements of the antenna by means of a coaxial cable, via a limited number of antenna ports (maximum 4). The disadvantage of this architecture is the loss of radio-frequency signal power between the antenna ports and the base station. It also limits the acceptable distance between the BTS and the passive antennas.

The centralised RAN (Radio Access Network) architecture, based on a geographical separation of the base band computing capacities (DU) for digital processing operations and the radio transmitters (RUs) for active analogue processing operations, was then developed. This type of architecture offers both functional benefits, thanks to better coordination between cells at centralised unit level, and cost benefits, through pooling the computing capacities of the various cells in common servers. For example, several RUs can communicate with one DU. The interface between the DU and the RU is referred to as a "FrontHaul", and can be used to move the RU up to a maximum distance of 20 km to centralise DUs.

As 3GPP specifications have introduced the concept of logical antenna port defined by a virtualisation (precoding/beam creation) of the logical antenna ports to the physical antenna ports, the physical antenna ports are now identified as Transceiver Units (TXRUs). In addition, TXRUs integrate the active analogue part by antenna port, thus defining an input port to the analogue domain.

The evolution of base stations has consisted in bringing the TXRUs as close as possible to the antenna, or integrated into the antenna in a radio unit RU. The base band processing unit DU is thus connected to the RU via an optical fibre carrying a digital signal, thereby limiting the propagation losses associated with the use of a coaxial cable.

In addition, the number of TXRUs has increased significantly over time, and can now reach the value of 64 for 5G (massive MIMO).

Figure 1:
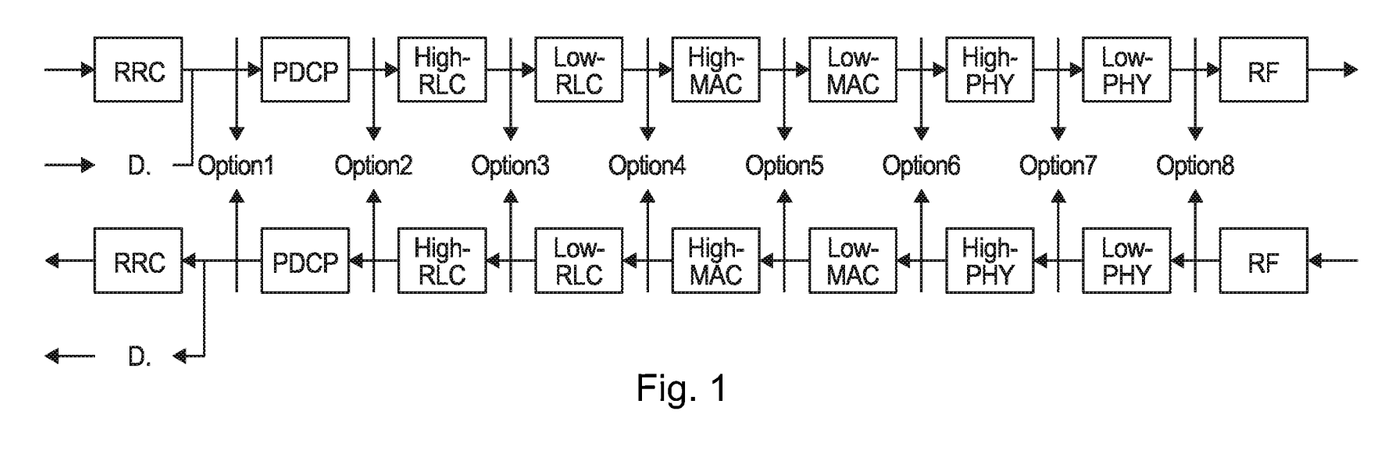
FIG. 1, introduced in the prior art section, illustrates various options for splitting functionalities between the radio and base band processing units, according to the 3GPP.

As illustrated in FIG. 1, several splits of functionalities between the RU and the DU have been proposed, with different requirements in terms of complexity of the RUs, intelligence of the DUs, or required bandwidth for transport.

The split of functionalities between the DU and the RU depends on the split option chosen. However, these splits do not provide a complete standardisation of interfaces that enable genuine interoperability between the various providers.

The xRAN Fronthaul working group, and more recently the O-RAN standardisation alliance, have taken charge of the complete specification of a single open and interoperable interface between different RU and DU providers ("Open Fronthaul").

To this end, they have defined the 7.2x split, that is an adaptation of the 7.2 split specified in the 3GPP and that reduces the complexity of the RU by moving processing functions up to the DU level. More specifically, the DU includes the RLC/MAC/PHY-high layers, and the RU includes the PHY-low layer. The PHY-low layer implemented in an RU comprises, in addition to the active analogue part of the antennas, some base band processing operations (close to the analogue part) such as FFT/IFFT or digital beamforming.

The resulting increase in bandwidth on the "open fronthaul" interface can be offset by compression mechanisms referenced by the O-RAN Alliance.

Figure 2:
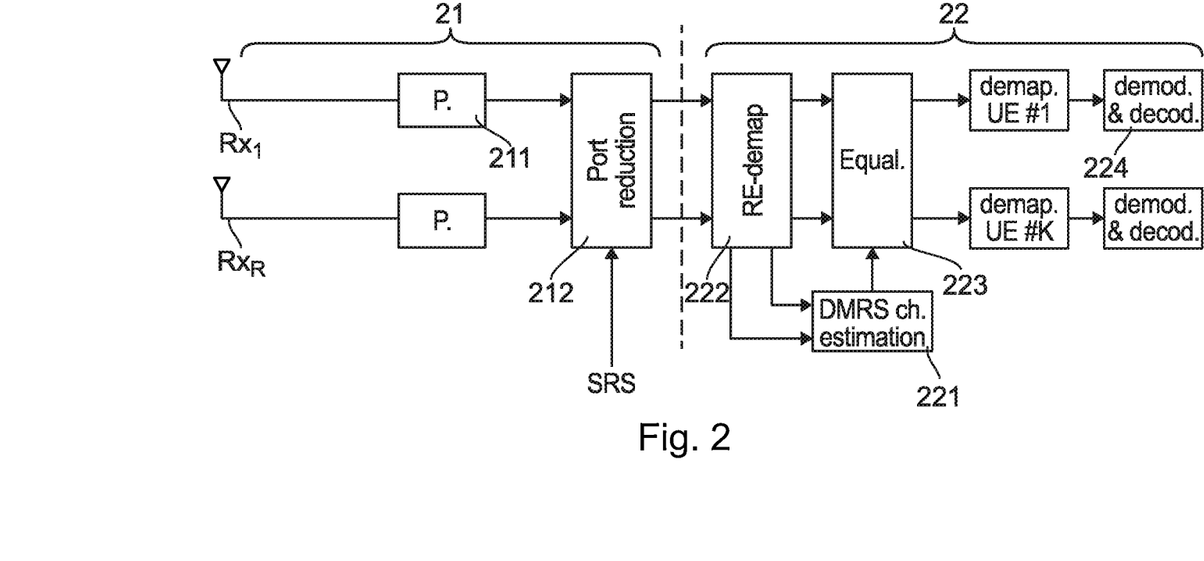

FIG. 2 illustrates more precisely the functionalities implemented by the RU 21 and by the DU 22, in the uplink direction, for split 7.2x.

The 7.2x split consists in transferring the channel estimation 221 and RE-demapping 222 functionalities (extraction and separation of the resource elements (REs) carrying the data and reference signals, in particular the DMRSs (De-Modulation Reference Signals)) to the ORAN Distributed Unit (O-DU) 22. In addition, the 7.2x split includes a functionality, implemented by the O-RU 21, referred to as port reduction 212, that reduces the number of streams to be transmitted to the O-DU. Thus, after processing 211 of the R radio-frequency signals received on the R reception branches, the number of streams to be transmitted to the O-DU is reduced in the port reduction 212. Without a technique for reducing the number of ports, the ORAN Radio Unit (O-RU) 21 would transmit a number of streams IQ equal to the number of reception branches R to the O-DU 22, whereas the number of spatial layers v to be detected is often much lower. To address this problem, the 7.2x split thus includes the port reduction functionality 212, that is a form of precoding. It is typically used to go from R=64 streams to v=8 streams for MU-MIMO uplink transmission with 8 spatial layers. It should be noted that these 8 streams can be distributed between a single PUSCH (SU-MIMO) or several PUSCHs (MU-MIMO) occupying the same time-frequency resource, each PUSCH i being transmitted from a different terminal (UE) and being able to carry $v_i$ spatial layers where $v=\Sigma_i v_i$.

However, this precoding 212 (performed by the O-RU) cannot be based on the DMRS-based channel estimation 221 (performed by the O-DU), as this would require sending all the R streams to the O-DU 22 (DMRS signals being carried by each PUSCH channel), which is contradictory to the aim of reducing the number of ports. Thus, the port reduction must be based on other reference signals, for example the SRSs transmitted in the uplink direction with a relatively high periodicity (in the order of 40 ms). As part of the 7.2x split, the O-DU 22 estimates the channel based on SRS signals and sends it back to the O-RU ("channel information based beamforming" option in the O-RAN standard) or sends the port reduction precoding coefficients directly back to the O-RU ("weights based beamforming" option in the O-RAN standard).

One advantage of the 7.2x split is that the equalisation 223 and decoding 224 functionalities can be co-located in the DU 22, making it possible to implement advanced receivers with interference subtraction involving a decoding feedback loop.

One disadvantage of the 7.2x split is that the precoding coefficients for the port reduction 212 are less up to date than if this precoding were based on a DMRS channel estimation, because the DMRSs are part of the PUSCH transmission (they provide a snapshot of the channel and the interference). There is therefore a major problem for the 7.2x split in receiving the PUSCH(s) in the uplink direction.

There is therefore a need for a new split of functionalities between the RU and the DU which does not have all the disadvantages of the prior art.

SUMMARY

The development proposes a solution which does not have all the disadvantages of the prior art, in the form of a method for processing radio-frequency signals received on R antennas, where $R \geq 2$, implementing a radio unit communicating with a base band processing unit.

According to the development, such a method comprises the following steps, implemented by the radio unit:
for each of the antennas, obtaining a frequency representation of the radio-frequency signal received on the antenna, formed by a set of complex samples;
demapping the (R) frequency representations, identifying useful resource elements, carrying data, and reference resource elements, carrying at least one reference signal,
a useful resource element carrying v data symbols and a reference resource element carrying v reference symbols, including at least one non-zero reference symbol, where $v \geq 1$ is the number of spatial layers used for transmitting the data and the reference signals,
first estimation of the transmission channel of the radio-frequency signals and of a noise-plus-interference covariance, from said at least one reference signal,
for at least one vector of R complex samples obtained respectively from each of the R frequency representations, projecting the vector of R complex samples onto a vector of L complex samples, referred to as projected samples, taking account of said first estimation of the channel and of the noise-plus-interference covariance, where $R > L \geq v$, and
transmitting the vector of L projected samples to the base band processing unit.

Such a method further comprises the following steps, implemented by the base band processing unit:
receiving the vector of L projected samples transmitted by the radio unit,
demapping the L projected samples, identifying at least one reference signal after projection,
second estimation of the transmission channel of said radio-frequency signals, after projection, from said at least one reference signal after projection,
equalising the L projected samples, taking account of said second channel estimation,
processing the equalised symbols.

The proposed solution is therefore based on a new distribution of functionalities between a radio unit (located as close as possible to the antenna structure of a base station) and a base band processing unit (located at bottom of the base station, or in a data centre close to the base station, for example within a radius of 20 km).

More specifically, a first channel and noise-plus-interference covariance estimation is implemented by the radio unit. It can therefore be implemented from DMRS-based reference signals for a more accurate estimation of the transmission channel and improved projection quality. In particular, it offers an interesting solution for receiving the PUSCH channel(s) in the uplink direction. A second estimation of the transmission channel of the radio-frequency signals, after projection, is also implemented by the base band processing unit. A second estimation of the noise-plus-interference covariance can possibly be implemented. Such an estimation of the noise-plus-interference covariance is not necessary if the projection is followed by a whitening.

As for equalisation and decoding, they are performed by the base band processing unit, enabling an advanced reception processing, in particular an iterative processing based on the subtraction of estimated interference.

In particular, the solution proposes a projection technique implemented by the radio unit, that reduces the quantity of signals intended for the base band processing unit. In particular, the projection is implemented on a vector of R complex samples obtained from the R frequency representations (one sample for each frequency representation). Thus, for a resource element, corresponding for example to a subcarrier of an OFDM symbol, the sample corresponding to this resource element (i.e. to this subcarrier of an OFDM symbol) is identified in each of the R frequency representations.

According to this embodiment, the projection is implemented for the useful resource elements and for the reference resource elements (i.e. before demapping). This eliminates the need to transmit control information from the radio unit to the base band processing unit.

A useful resource element carries one or more data symbols, a reference resource element carries one or more reference symbols.

A reference signal identifies all the reference symbols that can be used for channel estimation.

According to a first example, for a useful or reference resource element, the vector y of R complex samples as input to the projection is expressed as:

$$y = Hx + n$$

where $y \in \mathbb{C}^R$ is a vector of size R, H is the channel matrix representative of the transmission channel of size R×v, $x \in \mathbb{C}^v$ is a vector of data or reference symbols of size v, and $n \in \mathbb{C}^R$ is a noise-plus-interference vector of size R whose covariance matrix is $K_I = \mathbb{E}\{nn^\dagger\}$ of size R×R. The covariance matrix $K_I$ therefore represents the noise-plus-interference before projection.

The vector $y_1$ of L projected samples as output from the projection is expressed as:

$$y_1 = Gy = GHx + n_1,$$

where $y_1 \in \mathbb{C}^v$ is a vector of size L, $G \in \mathbb{C}^{L \times R}$ is the projection matrix of size L×R, $K_1 = \mathbb{E}\{n_1 n_1^\dagger\} = GK_I G^\dagger$. The matrix $K_1$ therefore represents the noise-plus-interference after projection.

According to this first example, the second channel estimation implemented by the base band processing unit implements the estimation of the channel matrix after projection GH and of the covariance matrix $K_1$ from the reference signal after projection sent by the RU to the DU, for example DMRS, in order to reconstruct the model $y_1 = GHx + n_1$.

According to a second example, for a useful or reference resource element, the vector y of R complex samples as input to the projection is expressed as:

$$y = Hx + n$$

where $y \in \mathbb{C}^R$ is a vector of size R, $H \in \mathbb{C}^{R \times v}$ is the channel matrix representative of the transmission channel of size R×v, $x \in \mathbb{C}^v$ is a vector of data or reference symbols of size v, and $n \in \mathbb{C}^R$ is a noise-plus-interference vector of size R whose covariance matrix before projection is $K_I = \mathbb{E}\{nn^\dagger\} \in \mathbb{C}^{R \times R}$.

According to this second example, the projection being followed by a whitening, the vector $y_1$ of L projected samples as output from the projection is expressed as:

$$y_1 = (GK_I G^\dagger)^{-\frac{1}{2}} Gy = G_b y = G_b Hx + n_1$$

where $y_1 \in \mathbb{C}^L$ is a vector of size L, $K_1 = \mathbb{E}\{n_1 n_1^\dagger\} = I_L$, where $I_L$ is an identity matrix of size L×L, representing the resulting noise-plus-interference after projection and whitening.

According to this second example, the second channel estimation implemented by the base band processing unit implements the channel matrix estimation $G_b H$ after projection, from the reference signal after projection, for example DMRS, in order to reconstruct the model $y_1 = GHx + n_1$.

According to these two examples, if L=v, the projection matrix G can be $G = H^\dagger K_I^{-1} \in \mathbb{C}^{v \times R}$, where the matrix $K_1$ is equal to $K_1 = (H^\dagger K_I^{-1} H) \in \mathbb{C}^{v \times v}$. This projection has the particularity to be without loss of information on the signal x.

In this case, the matrix $$K_I^{-\frac{1}{2}}$$

is first applied to the signal received y to whiten the noise, then a suitable filter is applied to obtain $G = H^\dagger K_I^{-1}$. Globally, a suitable whitening filter is therefore applied. The noise resulting from the application of the projection G not being white, the projection may be followed by a whitening of the noise.

According to the second example, if L≥v, the projection matrix can be equal to $$G = V^\dagger K_I^{-\frac{1}{2}} \in \mathbb{C}^{L \times R},$$

where $V = [u_1, u_2, \ldots, u_L] \in \mathbb{C}^{R \times L}$ is a matrix carrying L vectors of dimension R corresponding to L directions of arrival at reception.

In particular, the method further comprises the transmission, from the radio unit to the base band processing unit, of a type of projection implemented.

For example, the radio unit transmits to the base band processing unit a flag indicating whether or not the projection is a projection followed by a whitening, etc.

In this way, the base band processing unit knows what type of projection is implemented.

As a variant, the base band processing unit can inform the radio unit of the functionalities implemented by the base band processing unit. For example, if the base band processing unit implements a DMRS-based channel estimation, it can inform the radio unit, that knows it is not necessary to transmit control information in this case.

The development also relates to a corresponding method for receiving radio-frequency signals on R antennas, R≥2 implemented by a radio unit, comprising:

for each of the antennas, obtaining a frequency representation of the radio-frequency signal received on the antenna, formed by a set of complex samples;

demapping the frequency representations, identifying useful resource elements, carrying data, and reference resource elements, carrying at least one reference signal, a useful resource element carrying v data symbols and a reference resource element carrying v reference symbols, including at least one non-zero reference symbol, where v≥1 is the number of spatial layers used for the transmission, first estimation of the transmission channel of the radio-frequency signals and of a noise-plus-interference covariance, from said at least one reference signal, for at least one vector of R complex samples obtained respectively from each of the R frequency representations, projecting the vector of R complex samples onto a vector of L complex samples, referred to as projected samples, taking account of the first estimation of the channel and of the noise-plus-interference covariance, where R>L≥v, and transmitting the vector of L projected samples to the base band processing unit.

Such a reception method could, of course, comprise the different characteristics relating to the processing method as implemented by the radio unit, which may be combined or taken separately. Thus, the characteristics and advantages of the reception method are the same as those of the processing method as implemented by the radio unit previously described.

In another embodiment, the development relates to the corresponding radio unit.

The development also relates to a corresponding method for decoding radio-frequency signals received on R antennas, R≥2, implemented by a base band processing unit, comprising:

receiving a vector of L complex samples, referred to as projected samples, transmitted by the radio unit, obtained by projecting a vector of R complex samples, obtained respectively from each frequency representation of the R radio-frequency signals, onto the vector of L projected samples, where R>L≥v, and v≥1 is the number of spatial layers used for the transmission, demapping the L projected samples, identifying at least one reference signal after projection, second estimation of the transmission channel of the radio-frequency signals, after projection, from said at least one reference signal after projection, equalising the L projected samples, taking account of the second channel estimation, processing the equalised symbols.

Such a decoding method could, of course, comprise the different characteristics relating to the processing method as implemented by the base band processing unit, which may be combined or taken separately. Thus, the characteristics and advantages of the decoding method are the same as those of the processing method as implemented by the base band processing unit previously described.

In another embodiment, the development relates to the corresponding base band processing unit.

The development also relates to one or more computer programs comprising instructions for implementing a processing, reception or decoding method as described above when this or these programs are executed by at least one processor.

Finally, the development relates to a system comprising at least one corresponding radio unit, configured to process radio-frequency signals received on R antennas, where R≥2, and at least one corresponding base band processing unit.

According to the development, the radio unit comprises:

means for obtaining a frequency representation of the radio-frequency signal received on each of the antennas, each frequency representation being formed by a set of complex samples;

means for demapping the frequency representations, identifying useful resource elements, carrying data, and reference resource elements, carrying at least one reference signal, a useful resource element carrying v data symbols and a reference resource element carrying v reference symbols, including at least one non-zero reference symbol, where v≥1 is the number of spatial layers used for the transmission, means for estimating the transmission channel of the radio-frequency signals and a noise-plus-interference covariance, from said at least one reference signal, delivering a first estimation of the channel and of the noise-plus-interference covariance, means for projecting at least one vector of R complex samples, obtained respectively from each of the R frequency representations, onto a vector of L complex samples, referred to as projected samples, taking account of the first estimation of the channel and of the noise-plus-interference covariance, where R>L≥V, means for transmitting the vector of L projected samples to the base band processing unit, and the base band processing unit comprises:

means for receiving the vector of L projected samples transmitted by the radio unit, means for demapping the L projected samples, identifying at least one reference signal after projection, means for estimating the transmission channel of the radio-frequency signals, after projection, from said at least one reference signal after projection, delivering a second channel estimation, means for equalising the L projected samples, taking account of the second channel estimation, means for processing the equalised symbols.

BRIEF DESCRIPTION OF THE DRAWINGS

Other characteristics and advantages of the development will emerge more clearly upon reading the following description of a particular embodiment, provided as a simple illustrative non-restrictive example, and the annexed drawings, wherein:

FIG. 2, introduced in the prior art section, illustrates the 7.2x option;

DETAILED DESCRIPTION OF CERTAIN ILLUSTRATIVE EMBODIMENTS

General Principle

The general principle of the development is based on a new distribution of functionalities between the RU and the DU, according to which the RU implements a precoding/port reduction functionality based on an accurate channel estimation, and the DU implements the equalisation and decoding functionalities, enabling advanced reception processing.

As indicated in connection with the prior art, the RU, implementing the active part of the analogue processing, can be located as close as possible to the antenna structure. The DU, implementing the digital processing, can be located at the bottom of the antenna structure, or in a remote data centre, for example 15-20 km from the RU. In particular, a DU can serve several RUs ("pooling of resources").

One embodiment of the development is described below in the context of a 5G network, in which one or more terminals can share the same time-frequency resources.

A time-frequency resource is a granularity in frequency (sub-band) and time (one or more OFDM symbols). A sub-band can range from a resource element (a subcarrier of an OFDM symbol), also referred to as Resource Element or RE in the 3GPP standards, to a resource block (12 REs), also referred to as Physical Resource Block or PRB, or even to several PRBs.

For example, it is considered that the base station receives various radio-frequency signals on R antennas, corresponding to the transmission, by at least one terminal or UE, of a PUSCH (Physical Uplink Shared Channel) physical channel. A PUSCH channel can comprise several spatial layers v.

During a slot having a duration of 0.5 ms for a sub-carrier spacing of 30 kHz in the "New Radio" standard, several PUSCH physical channels can be transmitted from various terminals. These can be multiplexed in frequency, time and space (MU-MIMO).

A physical channel is understood here as a physical layer channel from a specific user that provides the means for radio transmission of reference data/signals from the MAC layer (or transport channels).

In order to benefit from the (precoded) channel estimation based on a DMRS-based reference signal, by PUSCH transmitted during a slot NR, for port reduction at the radio unit RU, and to enable advanced interference processing at the base band unit DU, a new split is proposed, according to which the RE demapping and channel estimation functionalities are implemented by the RU, and the equalisation functionality is implemented by the DU. In addition, in order to avoid the transmission of control information from the radio unit to the base band processing unit, a second channel estimation can be performed by the DU.

Figure 3:
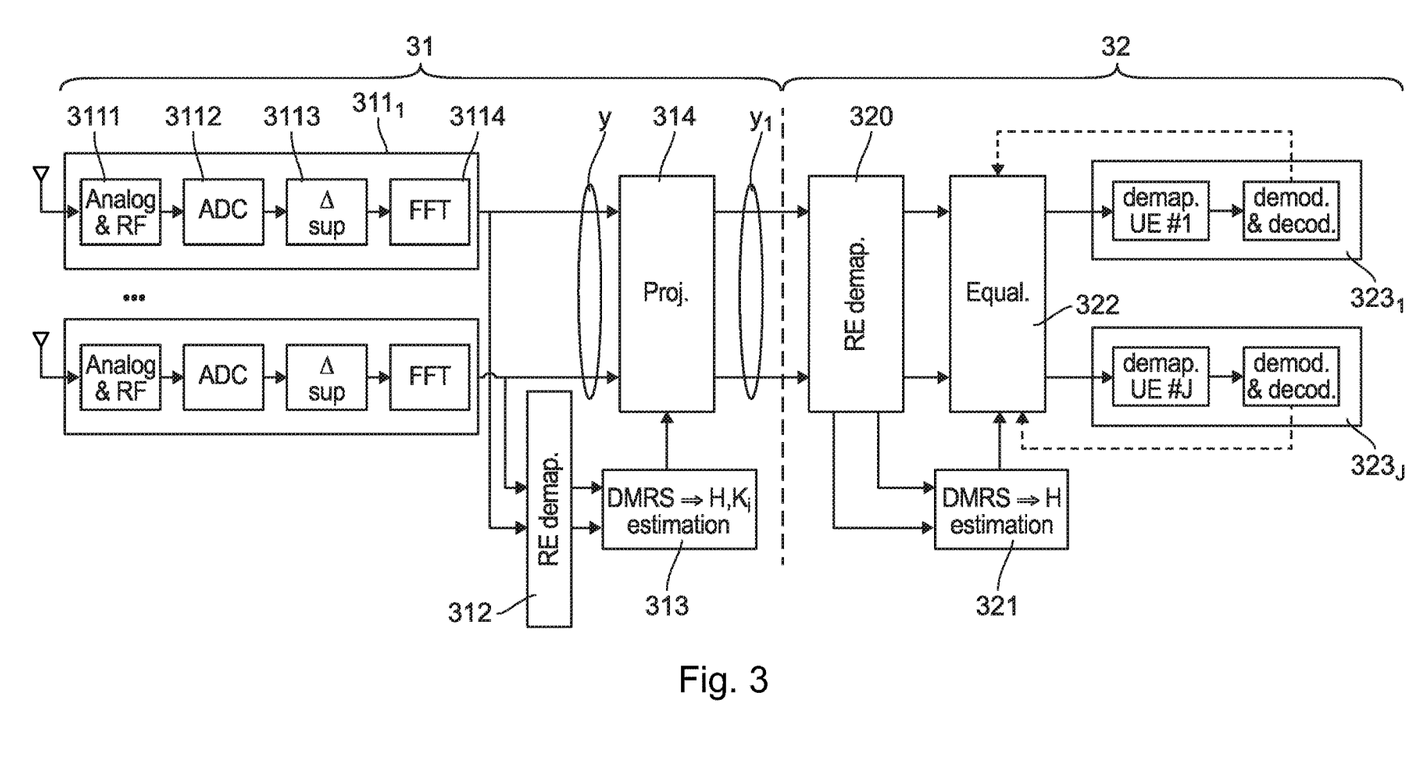
FIG. 3 shows the main steps implemented by a radio unit and a base band processing unit according to a particular embodiment of the development.

By way of illustration, FIG. 3 shows the main steps implemented by an RU 31 and by a DU 32 according to one embodiment, in the uplink direction.

A. Steps Implemented by the RU

For example, R antennas, or R reception branches, where R≥2, each receiving a different version of the same signal, corresponding to the combination of signals transmitted by at least one user terminal UE, for example a PUSCH, are considered. Each antenna r, where R≥r≥2, therefore receives a radio-frequency signal.

The RU 31 performs a processing operation 311r on the radio-frequency signal received on each antenna r, to obtain a frequency representation of the radio-frequency signal received on each antenna r. Each frequency representation is formed by a set of complex samples.

For example, the processing operation 3111 on the first antenna r=1 comprises:
receiving 3111 the radio-frequency signal ("analogue and RF" block). Receiving the radio-frequency signal is understood here as everything that corresponds to the active part of the analogue processing (filtering, amplification, frequency transposition), without the analogue-to-digital conversion,
analogue-to-digital conversion 3112 of the received radio-frequency signal,
deleting 3113 the guard interval if a guard interval was inserted before transmission,
transforming 3114 the time domain to the frequency domain of the digital signal, delivering a frequency representation of the received radio-frequency signal.

The RU 31 also implements a demapping 312 of the R frequency representations, also known as RE-demapping. This demapping separates the resource elements carrying data, referred to as useful resource elements, from the resource elements carrying reference signals, referred to as reference resource elements. A useful resource element can carry v data symbols, where v≥1 is the number of spatial layers used for transmitting the data.

The RU 31 also implements a first estimation 313 of the transmission channel of the radio-frequency signals and of the noise-plus-interference covariance impacting the radio-frequency signals, from said at least one reference signal extracted from the demapping 312, for example a DMRS.

In parallel, the data carried by the useful resource elements and the reference signals carried by the reference resource elements can, prior to RE-demapping 312, be filtered by the RU to reduce the signal size, taking account of the first estimation of the channel and of the noise-plus-interference covariance 313. In other words, the R frequency representations can be filtered by the RU 31.

Thus, for at least one useful or reference resource element, since the projection applies to the data and to the reference signals, before RE-demapping (i.e. for a subcarrier of an OFDM symbol), the RU 31 performs a projection 314 of the R complex samples associated with this resource element (i.e. of the R complex samples obtained respectively from each of the R frequency representations corresponding to this subcarrier—one sample per frequency representation) onto L complex samples, referred to as projected samples, taking account of the first estimation of the channel and of the noise-plus-interference covariance 313, where R>L≥v. More precisely, the same resource element k (associated with a particular OFDM symbol) for each reception branch, i.e. the same time-frequency position in the R received radio-frequency signals, is considered to construct a vector y of R complex samples.

The projection step 314, also referred to as precoding or port reduction, is described in more detail below.

Projection refers to a matrix $G_k \in \mathbb{C}^{L \times R}$ of size L×R applied to the received signal of dimension R (corresponding to R complex samples of the R frequency representations of the radio-frequency signals), for a useful or reference resource element k, to obtain a projected signal of dimension L where v≤L<R.

In the remainder of the description, the index of the resource element k (or the frequency index per subcarrier and the OFDM symbol index) is omitted to simplify notations.

The vector of R complex samples as input to the projection 314, corresponding to a useful or reference resource element (i.e. carrying data or a reference signal), for a PUSCH with v spatial layers (N=1) or several PUSCHs i with $v_i$ spatial layers in the case of a MU-MIMO transmission, i=1, ..., N, carrying a given total of $v=\Sigma_i v_i$ space layers, can be written as:

$$y = [H_1 \ \ldots \ H_N] \begin{bmatrix} x_1 \\ \vdots \\ x_N \end{bmatrix} + n = Hx + n.$$

where:

$y \in \mathbb{C}^R$ is a vector of size R, $H_i \in \mathbb{C}^{R \times v_i}$ is a matrix of size R×$v_i$ representative of the (precoded) channel of the PUSCH i estimated during step 313, for example from its DMRSs, where i=1, ..., N $x_i \in \mathbb{C}^{v_i}$ is a vector of data or reference symbols of size $v_i$ transmitted by the PUSCH, each data or reference symbol being associated with a spatial layer, where i=1, ..., N, and n∈ $\mathbb{C}^R$ is a noise-plus-interference vector whose covariance matrix is $K_I=\mathbb{E}\{nn^\dagger\}\in \mathbb{C}^{R\times R}$.

The matrix H∈ $\mathbb{C}^{R\times v}$ representative of the transmission channel associated with N PUSCH(s) transmitted on the same resource element can be written as $H=[H_1 \ldots H_N]\in \mathbb{C}^{R\times v}$, similarly the $v=\Sigma_i v_i$ spatial layers used to transmit the data or reference symbols can be written as a vector of dimension $x=[x_1^T \ldots x_N^T]^T\in \mathbb{C}^v$. When the vector x corresponds to a reference resource element, this carries symbols known to the receiver for channel estimation. In the case of a reference resource element, to limit the interference between spatial layers, in general, a single reference symbol $x_i$ is non-zero among the v reference symbols, in order to estimate the channel associated with the layer i (i=1, ..., v).

The first estimation of the channel and of the noise-plus-interference covariance 313 from the DMRS reference signals, for example, is used to determine the channel H∈ $\mathbb{C}^{R\times v}$ and covariance $K_I=\mathbb{E}\{nn^\dagger\}\in \mathbb{C}^{R\times R}$ matrices. The covariance matrix $K_I$ represents the noise-plus-interference before projection.

The projection matrix G reduces the size of the vector of the received samples y while trying to keep sufficient statistics (without loss of information) on the transmitted symbols x for reception. The suitable filter is known to provide sufficient statistics in the presence of white noise by projecting the received signal and the noise onto the subspace of the useful signal.

A.1 Projection

According to a first example, the projection 314 is not followed by a noise whitening.

In this case, the projection matrix G∈ $\mathbb{C}^{L\times R}$ is applied to the vector y, by the RU 31, to reduce the model to one dimension L, and to obtain, as output from the projection 314, a vector of complex samples, referred to as projected samples, $y_1\in \mathbb{C}^L$:

$$y_1 = Gy = GHx + n_1,$$

where $$K_1 = \mathbb{E}\{n_1 n_1^\dagger\} = (GK_I G^\dagger).$$

The matrix $K_1$ therefore represents the resulting noise-plus-interference after projection.

In the particular case where L=v, the projection matrix G can be $G=H^\dagger K_I^{-1}\in \mathbb{C}^{v\times R}$; this projection has the particularity to be without loss of information on the signal x.

According to another example, not claimed, the projection matrix G can be $G=H^\dagger\in \mathbb{C}^{v\times R}$, which is a good approximation of the suitable whitening filter without the complexity of covariance $K_I$ inversion when the matrix $K_I$ approaches a multiple matrix of the identity.

The vector $y_1$ of L projected samples can thus be transmitted to the DU 32 for the user data, via the DU/RU interface ("fronthaul"), for example by an optical fibre.

According to this embodiment, it is not necessary to transmit control information to the DU 32.

A.2. Projection Followed by a Noise Whitening

According to a second example, the projection 314 can be followed by a noise whitening.

In this case, the projection G∈ $\mathbb{C}^{L\times R}$ applied to the vector y by the RU 31 is followed by a whitening $$(GK_I G^\dagger)^{-\frac{1}{2}}$$

to reduce the model to one dimension L without noise. As output from the projection 314, a vector of complex samples, referred to as projected samples, is obtained $y_1\in \mathbb{C}^L$:

$$y_1 = (GK_I G^\dagger)^{-\frac{1}{2}} Gy = G_b y = G_b Hx + n_1$$

where $$K_1 = \mathbb{E}\{n_1 n_1^\dagger\} = I_L$$

where $I_L$ is an identity matrix of dimension L×L.

In the particular case where L=v, the projection matrix G can be $G=H^\dagger K_I^{-1}\in \mathbb{C}^{v\times R}$, followed by a whitening, such as $$G_b = (H^\dagger K_I^{-1} H)^{-\frac{1}{2}} H^\dagger K_I^{-1} \in \mathbb{C}^{v\times R};$$

this projection has the particularity to be without loss of information on the signal x.

According to another example, not claimed, the projection matrix G can be $G=H^\dagger\in \mathbb{C}^{v\times R}$, followed by a whitening, such as $$G_b = (H^\dagger K_I H)^{-\frac{1}{2}} H^\dagger \in \mathbb{C}^{v\times R},$$

which is a good approximation of the suitable whitening filter without the complexity of covariance $K_I$ inversion when the matrix $K_I$ approaches a multiple matrix of the identity (no or limited spatial correlation of noise-plus-interference).

In the particular case where L≥v, the projection matrix G can be defined as proposed below.

To do so, it is assumed that the array of reception antennas, of dimension R, is linear and that the antennas are uniformly spaced (for example, by half a wavelength).

Classically, a direction of arrival/departure of the signal can be associated with a DFT vector of dimension R (where each coefficient of the DFT corresponds to a multiplicative factor to be applied to a different reception antenna to form a reception beam in a given direction). All of the orthonormal DFT vectors form an orthonormal basis of the received signal, commonly used to analyse the arrival directions of the received signal.

The L vectors of dimension R that form the columns of the matrix $V=[u_1, u_2 \ldots, u_L]$ of dimension R×L are considered. These L orthonormal vectors correspond to the L best reception directions (taken from the R orthonormal DFT vectors forming a basis of the received signal) with respect to the whitened channel $$H_w = K_I^{-\frac{1}{2}} H P^{\frac{1}{2}},$$

where $K_I$ is the noise-plus-interference covariance matrix, P is the data symbol vector covariance x ($P=\mathbb{E}\{xx^\dagger\}$) and H is the channel estimated from the DMRSs at the RU. One direction (DFT vector) $u_1$ is better than another direction $u_2$ if and only if $u_1^\dagger H_w H_w^\dagger u_1 > u_2^\dagger H_w H_w^\dagger u_2$.

It should be noted that $H_w H_w^\dagger$ can be estimated as $\mathbb{E}\{y_w y_w^\dagger | H_w\} - I_R$ where $$y_w = K_I^{-\frac{1}{2}} y$$

and $I_R$ is the identity matrix of dimension R. This allows to estimate $H_w H_w^\dagger$ using an estimator of the type $$\frac{1}{N} \sum_{k=1}^{N} y_{w,k} y_{w,k}^\dagger - I_R$$

with N received (whitened) samples.

According to this example, the projection then consists in the succession of the following two steps:

1) noise-plus-interference whitening by multiplying $$K_I^{-\frac{1}{2}}$$

on the received signal y of dimension R,
2) projecting the signal received after whitening $$\left(K_I^{-\frac{1}{2}} y\right)$$

of dimension R onto the L directions selected by multiplying $V^\dagger$.

In the particular case where L≥v, the projection matrix G can therefore be $$V^\dagger K_I^{-\frac{1}{2}},$$

of dimension L×R.

The vector $y_1$ of L projected samples can thus be transmitted to the DU 32 for the user data, via the DU/RU interface ("fronthaul"), for example by an optical fibre.

Again, it is not necessary to transmit control information to the DU 32.

B. Steps Implemented by the DU

The DU 32 can thus receive the L projected samples transmitted by the radio unit 31 for a resource element k, for each PUSCH channel.

The DU 32 implements a demapping 320 of the L projected samples (carrying data and reference signals), making it possible to separate the resource elements carrying the data, referred to as useful resource elements, from the resource elements carrying the reference signals, referred to as reference resource elements.

The reference signals carried by the reference resource elements, for example DMRS, after projection, are used by the DU 32 to perform a second estimation 321 of the transmission channel after projection. The DMRS-based channel estimation is therefore performed once by the RU 31 and once by the DU 32.

If the projection 314 is followed by a whitening, the second estimation only estimates the transmission channel after projection $G_b H$. Indeed, the interference (for example, the noise-plus-interference variance or covariance) is assumed to be known by the DU. According to the second example above, it is assumed to be equal to the identity matrix: $K_1 = I_L$.

If the projection 314 is not followed by a whitening, the second estimation only estimates the interference after projection $K_1$.

The DU 32 can then implement an equalisation 322 of the L projected samples, taking account of the second DMRS-based channel estimation 321. The second channel estimation allows in particular to estimate that GH, as well as $K_1$ if the projection is not followed by a whitening.

Finally, the DU 32 implements a processing operation $323_j$ of the equalised symbols, for each user j, $1 \leq j \leq J$.

It is recalled that the purpose of the equalisation is to deal with interference between spatial layers in order to estimate/detect the symbols transmitted.

Thus, if a model after projection of the following type is considered:

$$y = Hx + n \text{ where } y \in \mathbb{C}^L (v \leq L < R), H \in \mathbb{C}^{L \times v} \text{ and } K_n = \mathbb{E}\{n \ n^\dagger\}$$

the equaliser is, for example, an LMMSE-IRC equaliser according to the 3GPP, i.e. a filter $f_i \in \mathbb{C}^{1 \times L}$ (i=1, . . . v) such that the estimated $\hat{x}_i = f_i y$ minimises $\|f_i y - x_i\|^2$, where $\|X\|^2 = \mathbb{E}\{|X|^2\}$ is the variance of the random variable X. $f_i$ is then proportional to the ith row of the matrix $H^\dagger (HH^\dagger + K_n)^{-1}$.

According to the first example described above, the DU receives the vector $y_1$.

As $y_1 = G_y = GHx + n_1$ and $K_1 = \mathbb{E}\{n_1 n_1^\dagger\} = (GK_f G^\dagger)$, and the product GH and $K_1$ are estimated again by the DU 32, it is possible to reconstruct the vector $x \in \mathbb{C}^v$ of data symbols.

According to the second example described above, the DU receives the vector $y_1$.

As $y_1 = G_b y = G_b Hx + n_1$ and the product $G_b H$ is estimated again by the DU 32, it is possible to reconstruct the vector $x \in \mathbb{C}^v$ of data symbols.

Various techniques can notably be implemented to inform the DU 32 of the type of projection implemented by the RU 31.

For example, the DU knows that the projection implemented by the RU is implemented on the useful and reference resource elements by configuration, or because it receives a message from the RU signalling this information to the DU, or because it does not receive any control information.

Thus, DU knows that a RE-demapping and a second channel estimation must be implemented by the DU.

Possibly, the DU can choose an option (projection implemented on the useful resource elements only, or on the useful and reference resource elements), and inform the RU of the option chosen.

The equalised symbol processing is a classic processing operation.

For example, the equalised symbol processing for the first user j=1 comprises:
  demapping the various spatial layers for the first user, delivering data symbols,
  demodulating and decoding the data symbols.

In particular, in the context of an advanced receiver, a feedback loop with equalisation 322 can be provided. For multiple user detection/equalisation (MU-MIMO), the equalisation can be performed jointly or separately by PUSCH. A feedback loop between the decoding of all users and the equalisation of users is possible in the context of an advanced receiver.

Simplified Structure of a Radio Unit and a Base Band Processing Unit

Figure 4:
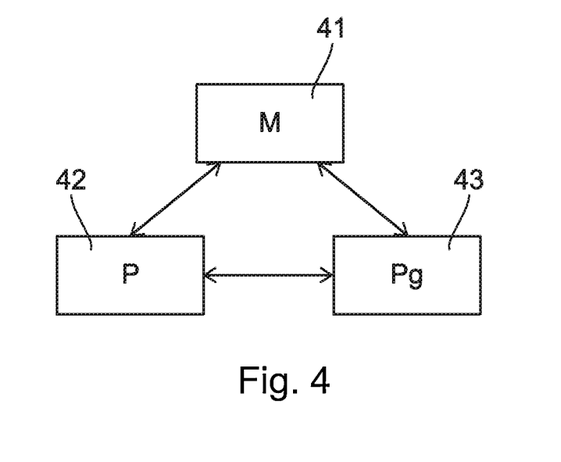
FIG. 4 shows the simplified structure of a radio unit according to a particular embodiment.

In relation to FIG. 4, the simplified structure of a radio unit according to at least one embodiment described above is now presented.

As illustrated in FIG. 4, such a radio unit comprises at least one memory 41 comprising a buffer memory, at least one processing unit 42, equipped for example with a programmable computing machine or a dedicated computing machine, for example a processor P, and controlled by the computer program 43, implementing steps of the reception method according to at least one embodiment of the development.

At initialisation, the code instructions of the computer program 43 are for example loaded into a RAM memory before being executed by the processor of the processing unit 42.

The processor of the processing unit 42 implements steps of the reception method previously described, according to the instructions of the computer program 43, to:

obtain a frequency representation of the radio-frequency signal received on each of the antennas, each frequency representation being formed by a set of complex samples;

demap the frequency representations to identify useful resource elements, carrying data, and reference resource elements, carrying at least one reference signal, a useful resource element carrying v data symbols and a reference resource element carrying v reference symbols, where v≥1 is the number of spatial layers used for the transmission, estimate the transmission channel of the radio-frequency signals and a noise-plus-interference covariance, from said at least one reference signal, delivering a first estimation of the channel and of the noise-plus-interference covariance, project at least one vector of R complex samples, obtained respectively from each of the R frequency representations, onto a vector of L complex samples, referred to as projected samples, taking account of the first estimation of the channel and of the noise-plus-interference covariance, where R>L≥v, transmit the vector of L projected samples to the base band processing unit.

Figure 5:
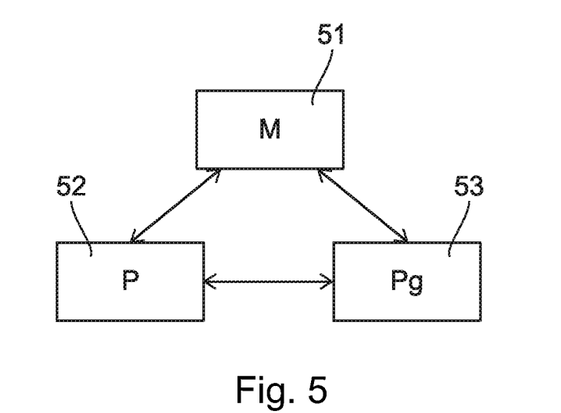
FIG. 5 shows the simplified structure of a base band processing unit according to a particular embodiment.

In relation to FIG. 5, the simplified structure of a base band processing unit according to at least one embodiment described above is finally presented.

As illustrated in FIG. 5, such a base band processing unit comprises at least one memory 51 comprising a buffer memory, at least one processing unit 52, equipped for example with a programmable computing machine or a dedicated computing machine, for example a processor P, and controlled by the computer program 53, implementing steps of the decoding method according to at least one embodiment of the development.

At initialisation, the code instructions of the computer program 53 are for example loaded into a RAM memory before being executed by the processor of the processing unit 52.

The processor of the processing unit 52 implements steps of the decoding method previously described, according to the instructions of the computer program 53, to:

receive the vector of L projected samples transmitted by the radio unit, demap the L projected samples to identify at least one reference signal after projection, estimate the transmission channel of the radio-frequency signals after projection, from said at least one reference signal after projection, delivering a second channel estimation, equalise the L projected samples, taking account of said second channel estimation, process (in particular decode) the equalised symbols.

The invention claimed is:

1. A method of processing radio-frequency signals received on R antennas, where R≥2, implementing a radio unit communicating with a base band processing unit, wherein the method comprises, implemented by the radio unit:

for each of the antennas, obtaining a frequency representation of a radio-frequency signal received on the antenna, formed by a set of complex samples, demapping the frequency representations, identifying useful resource elements, carrying data, and reference resource elements, carrying at least one reference signal, a useful resource element carrying v data symbols and a reference resource element carrying v reference symbols, including at least one non-zero reference symbol, where v≥1 is the number of spatial layers used for the transmission, first estimation of a transmission channel of the radio-frequency signals and of a noise-plus-interference covariance, from the at least one reference signal, for at least one vector of R complex samples obtained respectively from each of the frequency representations, projecting the vector of R complex samples onto a vector of L complex samples, referred to as projected samples, taking account of the first estimation of the channel and of the noise-plus-interference covariance, where R>L≥v, transmitting the vector of L projected samples to the base band processing unit, and wherein the method comprises, implemented by the base band processing unit:

receiving the vector of L projected samples transmitted by the radio unit, demapping the L projected samples, identifying at least one reference signal after projection, second estimation of the transmission channel of the radio-frequency signals, after projection, from the at least one reference signal after projection, equalising the L projected samples, taking account of the second estimation of the transmission channel, processing the equalised symbols.

2. The method according to claim 1, wherein the at least one reference signal before projection or after projection is of a DeModulation Reference Signal (DMRS) type.

3. The method according to claim 1, wherein the vector of R complex samples as input to the projection is expressed as:

$$y = Hx + n$$

where $y \in \mathbb{C}^R$, $H \in \mathbb{C}^R$, H is a channel matrix representative of the transmission channel, $x \in \mathbb{C}^v$ is a vector of data or reference symbols, and $n \in \mathbb{C}^R$ is a noise-plus-interference vector whose covariance matrix is $K_I = \mathbb{E}\{nn^\dagger\}$, and in that the vector of L projected samples as output from the projection is expressed as:

$$y_1 = Gy = GHx + n_1, \text{ where } y_1 \in \mathbb{C}^v, G \in \mathbb{C}^{L \times R}, K_1 = \mathbb{E}\{n_1 n_1^\dagger\} = GK_I G^\dagger.$$

4. The method according to claim 1, wherein the vector of R complex samples as input to the projection is expressed as:

$$y = Hx + n$$

where $y \in \mathbb{C}^R$, $H \in \mathbb{C}^{R \times v}$ is a channel matrix representative of the transmission channel, $x \in \mathbb{C}^v$ is a vector of data or reference symbols, and $n \in \mathbb{C}^R$ is a noise-plus-interference vector whose covariance matrix is $K_I = \mathbb{E}\{nn^\dagger\} \in \mathbb{C}^{R \times R}$, and in that the vector of L projected samples as output from the projection is expressed as:

$$y_1 = \left(GK_I G^\dagger\right)^{-\frac{1}{2}} Gy = G_b y = G_b Hx + n_1 \text{ where } y_1 \in \mathbb{C}^L,$$

$$K_1 = \mathbb{E}\{n_1 n_1^\dagger\} = I_L.$$

5. The method according to claim 3, wherein for L=v, a projection matrix is equal to $G = H^\dagger K_I^{-1} \in \mathbb{C}^{v \times R}$.

6. The method according to claim 4, wherein for L≥v, a projection matrix is equal to $$G = V^\dagger K_I^{-\frac{1}{2}} \in \mathbb{C}^{L \times R},$$

where $V = [u_1, u_2, \ldots, u_L] \in \mathbb{C}^{R \times L}$ is a matrix carrying L vectors of dimension R corresponding to L directions of arrival at reception.

7. The method according to claim 1, wherein the method further comprises transmitting, from the radio unit to the base band processing unit, a type of projection implemented.

8. A method of receiving radio-frequency signals on R antennas, where R≥2, implementing a radio unit communicating with a base band processing unit, wherein the method comprises, implemented by the radio unit:

for each of the antennas, obtaining a frequency representation of the radio-frequency signal received on the antenna, formed by a set of complex samples, demapping the frequency representations, identifying useful resource elements, carrying data, and reference resource elements, carrying at least one reference signal, a useful resource element carrying v data symbols and a reference resource element carrying v reference symbols, including at least one non-zero reference symbol, where v≥1 is the number of spatial layers used for the transmission, first estimation of a transmission channel of the radio-frequency signals and of a noise-plus-interference covariance, from the at least one reference signal, for at least one vector of R complex samples obtained respectively from each of the frequency representations, projecting the vector of R complex samples onto a vector of L complex samples, referred to as projected samples, taking account of the first estimation of the channel and of the noise-plus-interference covariance, where R>L≥v, and transmitting the vector of L projected samples to the base band processing unit.

9. A method of decoding radio-frequency signals received on R antennas, where R≥2, implementing a radio unit communicating with a base band processing unit, wherein the method comprises, implemented by the base band processing unit:

receiving a vector of L complex samples, referred to as projected samples, transmitted by the radio unit, obtained by projecting a vector of R complex samples, obtained respectively from each frequency representation of the radio-frequency signals, onto the vector of L projected samples, where R>L≥v, and v≥1 is the number of spatial layers used for the transmission, demapping the L projected samples, identifying at least one reference signal after projection, estimation of a transmission channel of the radio-frequency signals, after projection, from the at least one reference signal after projection, equalising the L projected samples, taking account of the channel estimation, processing the equalised symbols.

10. A processing circuit comprising a processor and a memory, the memory storing program code instructions of a computer program for implementing the method according to claim 1 when the computer program is executed by the processor.

11. A system comprising at least one radio unit, configured to process radio-frequency signals received on R antennas, where R≥2, and at least one base band processing unit, wherein the radio unit comprises at least a first processor configured to:

obtain a frequency representation of the radio-frequency signal received on each of the antennas, each frequency representation being formed by a set of complex samples, demap the frequency representations, identifying useful resource elements, carrying data, and reference resource elements, carrying at least one reference signal, a useful resource element carrying v data symbols and a reference resource element carrying v reference symbols, including at least one non-zero reference symbol, where v≥1 is the number of spatial layers used for the transmission, estimate a transmission channel of the radio-frequency signals and a noise-plus-interference covariance, from the at least one reference signal, delivering a first estimation of the channel and of the noise-plus-interference covariance, project at least one vector of R complex samples, obtained respectively from each of the frequency representations, onto a vector of L complex samples, referred to as projected samples, taking account of the first estimation of the channel and of the noise-plus-interference covariance, where R>L≥v, transmit the vector of L projected samples to the base band processing unit, and wherein the base band processing unit comprises:

receive the vector of L projected samples transmitted by the radio unit,
demap the L projected samples, identifying at least one reference signal after projection,
estimate the transmission channel of the radio-frequency signals after projection, from the at least one reference signal after projection, delivering a second channel estimation,
equalise the L projected samples, taking account of the second channel estimation,
process the equalised symbols.

* * * * *